United States Patent
Kim (10) Patent No.: US 12,256,456 B2
(45) Date of Patent: Mar. 18, 2025

(54) METHOD AND APPARATUS FOR PROVIDING UE ASSISTANCE INFORMATION ON RRC STATE PREFERENCE IN WIRELESS COMMUNICATION SYSTEM

(71) Applicants: BLACKPIN Inc., Seoul (KR); Soenghun Kim, Hanam-si (KR)

(72) Inventor: Soenghun Kim, Hanam-si (KR)

(73) Assignees: Blackpin Inc., Seoul (KR); Soenghun Kim, Hanam-si (KR)

( * ) Notice: Subject to any disclaimer, the term of this patent is extended or adjusted under 35 U.S.C. 154(b) by 0 days.

(21) Appl. No.: 18/670,683

(22) Filed: May 21, 2024

(65) Prior Publication Data

US 2024/0324049 A1    Sep. 26, 2024

Related U.S. Application Data

(63) Continuation of application No. PCT/KR2022/019383, filed on Dec. 1, 2022.

(30) Foreign Application Priority Data

Dec. 29, 2021  (KR) .................. 10-2021-0191547

(51) Int. Cl.
*H04W 76/20*    (2018.01)
*H04W 8/20*    (2009.01)
(Continued)

(52) U.S. Cl.
CPC ............. *H04W 76/20* (2018.02); *H04W 8/20* (2013.01); *H04W 8/22* (2013.01); *H04W 36/08* (2013.01)

(58) Field of Classification Search
CPC ......... H04W 8/20; H04W 8/22; H04W 36/08; H04W 76/20
See application file for complete search history.

(56) References Cited

U.S. PATENT DOCUMENTS 12,041,476 B2 *  7/2024  Ying ................. H04W 74/0866
12,069,733 B2 *  8/2024  Ye ......................... H04L 5/0053
(Continued)

FOREIGN PATENT DOCUMENTS

KR    10-2015-0073991 A    7/2015
KR    10-2021-0034477 A    3/2021
(Continued)

OTHER PUBLICATIONS

International Search Report for International Patent Application No. PCT/KR2022/019383, dated Feb. 27, 2023.
(Continued)

*Primary Examiner* — Congvan Tran
(74) *Attorney, Agent, or Firm* — Fish & Richardson P.C.

(57) ABSTRACT

A Method and Apparatus for multi-SIM operation during mobility is provided. The method includes Aspects of the present disclosure are to address Multi-SIM operation during mobility. The method includes receiving an RRC reconfiguration message comprising configuration of a terminal assistance information related to an RRC state transition, initiating a terminal assistance information process based on said configuration information in said RRC control message, initiating a T2 after transmitting the UEAssistanceInformation if said UEAssistanceInformation includes a musimPreferredRRC-State IE, receiving an RRCRelease message including a SuspendConfig and performing a first set of actions in response to receiving said RRCRelease message.

2 Claims, 7 Drawing Sheets

(51) Int. Cl.
*H04W 8/22* (2009.01)
*H04W 36/08* (2009.01)

(56) References Cited

U.S. PATENT DOCUMENTS

| | | | | |
|---|---|---|---|---|
| 2019/0380128 | A1* | 12/2019 | Park | H04W 72/29 |
| 2020/0260496 | A1* | 8/2020 | Jin | H04W 74/0833 |
| 2022/0191752 | A1* | 6/2022 | Rune | H04W 36/362 |
| 2023/0388891 | A1* | 11/2023 | Wu | H04W 36/0007 |
| 2023/0389119 | A1* | 11/2023 | Araujo | H04W 76/15 |
| 2024/0107409 | A1* | 3/2024 | Da Silva | H04W 52/0212 |

FOREIGN PATENT DOCUMENTS

| | | |
|---|---|---|
| KR | 10-2021-0095605 A | 8/2021 |
| KR | 10-2021-0143047 A | 11/2021 |

OTHER PUBLICATIONS

3GPP TS 38.331 V16.6.0 (Sep. 2021); Technical Specification; 3rd Generation Partnership Project; Technical Specification Group Radio Access Network; NR; Radio Resource Control (RRC) protocol specification (Release 16).
Vivo, "Running NR RRC CR for Musim," 3GPP TSG-RAN WG2 Meeting #116-e, Electronic Meeting, R2-2110390 Nov. 1-12, 2021.
Huawei et al., "Discussion on the remaining issues for NW switching," 3GPP TSG-RAN WG2 Meeting #116 electronic, Online, R2-2110542, Nov. 1-12, 2021.
Nokia et al., "Remaining aspects for switching notification without leaving RRC_Connected," 3GPP TSG-RAN WG2 Meeting #116 Electronic, Online, R2-2110142, Nov. 1-12, 2021.
Ericsson, "Discussion on switchover procedure without leaving RRC_Connected state," 3GPP TSG-RAN WG2 #116e, Electronic meeting, Tdoc TR2-2110775 Revision of R2-2107973, Nov. 1-12, 2021.
Ericsson, "Discussion on switchover procedure for leaving RRC_Connected state," 3GPP TSG-RAN WG2 #116e, Electronic meeting, Tdoc R2-21xxxxx(R2-2110781) Revision of R2-2107975, Nov. 1-12, 2021.
Vivo, "Running NR RRC CR for Musim," 3GPP TSG-RAN WG2 Meeting #116-e, Electronic Meeting, R2-2111602, Nov. 1-12, 2021.
Vivo, "Running NR RRC CR for Musim," 3GPP TSG-RAN WG2 Meeting #116-e, Electronic Meeting, R2-21xxxxx, Nov. 1-12, 2021.

* cited by examiner

FIG.1A

User Plane Protocol Stack

Control Plane Protocol Stack

METHOD AND APPARATUS FOR PROVIDING UE ASSISTANCE INFORMATION ON RRC STATE PREFERENCE IN WIRELESS COMMUNICATION SYSTEM

CROSS-REFERENCE TO RELATED APPLICATION

This application is a continuation of International Application No. PCT/KR2022/019383, filed on Dec. 1, 2022, which claims priority to and the benefit of Korean Patent Application 10-2021-0191547, filed on Dec. 29, 2021, the disclosure of which is incorporated herein by reference in its entirety.

BACKGROUND

Technical Field

The present disclosure relates to Multi-SIM operation during handover based on reporting on terminal state in mobile wireless communication system

RELATED ART

To meet the increasing demand for wireless data traffic since the commercialization of 4th generation (4G) communication systems, the 5th generation (5G) system is being developed. For the sake of high, 5G system introduced millimeter wave (mmW) frequency bands (e. g. 60 GHz bands). In order to increase the propagation distance by mitigating propagation loss in the 5G communication system, various techniques are introduced such as beamforming, massive multiple-input multiple output (MIMO), full dimensional MIMO (FD-MIMO), array antenna, analog beamforming, and large-scale antenna. In addition, base station is divided into a central unit and plurality of distribute units for better scalability. To facilitate introduction of various services, 5G communication system targets supporting higher data rate and smaller latency.

Multi-USIM devices are being more and more popular in many countries. The user may have both a personal and a business subscription in one device or has two personal subscriptions in one device for different services. However, support for multi-USIM within a device is currently handled in an implementation-specific manner without any support from 3GPP specifications, resulting in a variety of implementations and UE behaviours. Standardiz2A-ing support for such UE's can prove beneficial from a performance perspective in that network functionality can be based on predictable UE behaviour.

SUMMARY

Aspects of the present disclosure are to address Multi-SIM operation during mobility. The method includes receiving an RRC reconfiguration message comprising configuration of a terminal assistance information related to an RRC state transition, initiating a terminal assistance information process based on said configuration information in said RRC control message, initiating a T2 after transmitting the UEAssistanceInformation if said UEAssistanceInformation includes a musim-PreferredRRC-State IE, receiving an RRCRelease message including a SuspendConfig and performing a first set of actions in response to receiving said RRCRelease message.

DETAILED DESCRIPTION

Hereinafter, embodiments of the present invention will be described in detail with reference to the accompanying drawings. In addition, in the description of the present invention, if it is determined that a detailed description of a related known function or configuration may unnecessarily obscure the gist of the present invention, the detailed description thereof will be omitted. In addition, the terms to be described later are terms defined in consideration of functions in the present invention, which may vary according to intentions or customs of users and operators. Therefore, the definition should be made based on the content throughout this specification.

The terms used, in the following description, for indicating access nodes, network entities, messages, interfaces between network entities, and diverse identity information is provided for convenience of explanation. Accordingly, the terms used in the following description are not limited to specific meanings but may be replaced by other terms equivalent in technical meanings.

In the following descriptions, the terms and definitions given in the latest 3GPP standards are used for convenience of explanation. However, the present disclosure is not limited by use of these terms and definitions and other arbitrary terms and definitions may be employed instead.

Table 1 lists the acronyms used throughout the present disclosure.

TABLE 1

| Acronym | Full name | Acronym | Full name |
|---|---|---|---|
| 5GC | 5G Core Network | RACH | Random Access Channel |
| ACK | Acknowledgement | RAN | Radio Access Network |
| AM | Acknowledged Mode | RAR | Random Access Response |
| AMF | Access and Mobility Management Function | RA-RNTI | Random Access RNTI |
| ARQ | Automatic Repeat Request | RAT | Radio Access Technology |

TABLE 1-continued

| Acronym | Full name | Acronym | Full name |
| --- | --- | --- | --- |
| AS | Access Stratum | RB | Radio Bearer |
| ASN.1 | Abstract Syntax Notation One | RLC | Radio Link Control |
| BSR | Buffer Status Report | RNA | RAN-based Notification Area |
| BWP | Bandwidth Part | RNAU | RAN-based Notification Area Update |
| CA | Carrier Aggregation | RNTI | Radio Network Temporary Identifier |
| CAG | Closed Access Group | RRC | Radio Resource Control |
| CG | Cell Group | RRM | Radio Resource Management |
| C-RNTI | Cell RNTI | RSRP | Reference Signal Received Power |
| CSI | Channel State Information | RSRQ | Reference Signal Received Quality |
| DCI | Downlink Control Information | RSSI | Received Signal Strength Indicator |
| DRB | (user) Data Radio Bearer | SCell | Secondary Cell |
| DRX | Discontinuous Reception | SCS | Subcarrier Spacing |
| HARQ | Hybrid Automatic Repeat Request | SDAP | Service Data Adaptation Protocol |
| IE | Information element | SDU | Service Data Unit |
| LCG | Logical Channel Group | SFN | System Frame Number |
| MAC | Medium Access Control | S-GW | Serving Gateway |
| MIB | Master Information Block | SI | System Information |
| NAS | Non-Access Stratum | SIB | System Information Block |
| NG-RAN | NG Radio Access Network | SpCell | Special Cell |
| NR | NR Radio Access | SRB | Signalling Radio Bearer |
| PBR | Prioritised Bit Rate | SRS | Sounding Reference Signal |
| PCell | Primary Cell | SS | Search Space |
| PCI | Physical Cell Identifier | SSB | SS/PBCH block |
| PDCCH | Physical Downlink Control Channel | SSS | Secondary Synchronisation Signal |
| PDCP | Packet Data Convergence Protocol | SUL | Supplementary Uplink |
| PDSCH | Physical Downlink Shared Channel | TM | Transparent Mode |
| PDU | Protocol Data Unit | UCI | Uplink Control Information |
| PHR | Power Headroom Report | UE | User Equipment |
| PLMN | Public Land Mobile Network | UM | Unacknowledged Mode |
| PRACH | Physical Random Access Channel | CS-RNTI | Configured Scheduling-RNTI |
| PRB | Physical Resource Block | TAG | Timing Advance Group |
| PSS | Primary Synchronisation Signal | SDT | Small Data Transmission |
| PUCCH | Physical Uplink Control Channel | RA-SDT | Random Access -SDT |
| PUSCH | Physical Uplink Shared Channel | CG-SDT | Configured Grant-SDT |
| PTAG | Primary TAG | STAG | Secondary TAG |

Table 2 lists the terminologies and their definition used throughout the present disclosure.

TABLE 2

| Terminology | Definition |
| --- | --- |
| Carrier frequency | center frequency of the cell. |
| Cell | combination of downlink and optionally uplink resources. The linking between the carrier frequency of the downlink resources and the carrier frequency of the uplink resources is indicated in the system information transmitted on the downlink resources. |
| Cell Group | in dual connectivity, a group of serving cells associated with either the MeNB or the SeNB. |
| Cell reselection | A process to find a better suitable cell than the current serving cell based on the system information received in the current serving cell |
| Cell selection | A process to find a suitable cell either blindly or based on the stored information |
| Cell Reselection Priority | Priority of a carrier frequency regarding cell reselection. System Information Block 2 and System Information Block 3 provide the CRP of the serving frequency and CRPs of inter-frequencies respectively. UE consider higher priority frequency for cell reselection if channel condition of the frequency is better than a specific threshold even if channel condition of a lower priority frequency is better than that of the higher priority frequency. |

TABLE 2-continued

| Terminology | Definition |
|---|---|
| Dedicated signalling | Signalling sent on DCCH logical channel between the network and a single UE. |
| Field | The individual contents of an information element are referred to as fields. |
| Frequency layer | set of cells with the same carrier frequency. |
| Global cell identity | An identity to uniquely identifying an NR cell. It is consisted of cellIdentity and plmn-Identity of the first PLMN-Identity in plmn-IdentityList in SIB1. |
| gNB | node providing NR user plane and control plane protocol terminations towards the UE, and connected via the NG interface to the 5GC. |
| Handover | procedure that changes the serving cell of a UE in RRC_CONNECTED. |
| Information element | A structural element containing single or multiple fields is referred as information element. |
| L | The Length field in MAC subheader indicates the length of the corresponding MAC SDU or of the corresponding MAC CE |
| LCID | 6 bit logical channel identity in MAC subheader to denote which logical channel traffic or which MAC CE is included in the MAC subPDU |
| Logical channel | a logical path between a RLC entity and a MAC entity. There are multiple logical channel types depending on what type of information is transferred e.g. CCCH (Common Control Channel), DCCH (Dedicate Control Channel), DTCH (Dedicate Traffic Channel), PCCH (Paging Control Channel) |
| NR | NR radio access |
| PCell | SpCell of a master cell group. |
| registered PLMN | PLMN which UE has registered to |
| selected PLMN | PLMN which UE has selected to perform registration procedure |
| equivalent PLMN | PLMN which is equivalent to registered PLMN. UE is informed of list of EPLMNs by AMF during registration procedure |
| PLMN ID Check | the process that checks whether a PLMN ID is the RPLMN identity or an EPLMN identity of the UE. |
| Primary Cell | The MCG cell, operating on the primary frequency, in which the UE either performs the initial connection establishment procedure or initiates the connection re-establishment procedure. |
| Radio Bearer | Logical path between a PDCP entity and upper layer (i.e. SDAP entity or RRC) |
| RLC bearer | RLC and MAC logical channel configuration of a radio bearer in one cell group. |
| RLC bearer configuration | The lower layer part of the radio bearer configuration comprising the RLC and logical channel configurations. |
| Serving Cell | For a UE in RRC_CONNECTED not configured with CA/DC there is only one serving cell comprising of the primary cell. For a UE in RRC_CONNECTED configured with CA/DC the term 'serving cells' is used to denote the set of cells comprising of the Special Cell(s) and all secondary cells. |
| SpCell | primary cell of a master or secondary cell group. |
| Special Cell | For Dual Connectivity operation the term Special Cell refers to the PCell of the MCG or the PSCell of the SCG, otherwise the term Special Cell refers to the PCell. |
| SRB | Signalling Radio Bearers" (SRBs) are defined as Radio Bearers (RBs) that are used only for the transmission of RRC and NAS messages. |
| SRB0 | SRB0 is for RRC messages using the CCCH logical channel |
| SRB1 | SRB1 is for RRC messages (which may include a piggybacked NAS message) as well as for NAS messages prior to the establishment of SRB2, all using DCCH logical channel; |
| SRB2 | SRB2 is for NAS messages and for RRC messages which include logged measurement information, all using DCCH logical channel. SRB2 has a lower priority than SRB1 and may be configured by the network after AS security activation; |
| SRB3 | SRB3 is for specific RRC messages when UE is in (NG)EN-DC or NR-DC, all using DCCH logical channel |
| SRB4 | SRB4 is for RRC messages which include application layer measurement reporting information, all using DCCH logical channel. |
| DCCH | DCCH is a logical channel to transfer RRC messages after RRC connection establishment |
| Suitable cell | A cell on which a UE may camp. Following criteria apply<br>The cell is part of either the selected PLMN or the registered PLMN or PLMN of the Equivalent PLMN list<br>The cell is not barred<br>The cell is part of at least one TA that is not part of the list of "Forbidden Tracking Areas for Roaming" (TS 22.011 [18]), which belongs to a PLMN that fulfils the first bullet above. |

TABLE 2-continued

| Terminology | Definition |
| --- | --- |
| | The cell selection criterion S is fulfilled (i.e. RSRP and RSRQ are better than specific values |

In the present invention, "trigger" or "triggered" and "initiate" or "initiated" may be used in the same meaning. In the present invention, "radio bearer second resume procedure is allowed", "radio bearer second resume procedure is configured" and "radio bearer second resume procedure is enabled" may be used in the same meaning. In the present invention, second resume procedure and Small Data Transfer (SDT) may be used in the same meaning. In the present invention, UE and terminal may be used in the same meaning. In the present invention, base station and NG-RAN node may be used in the same meaning.

Figure 1A:
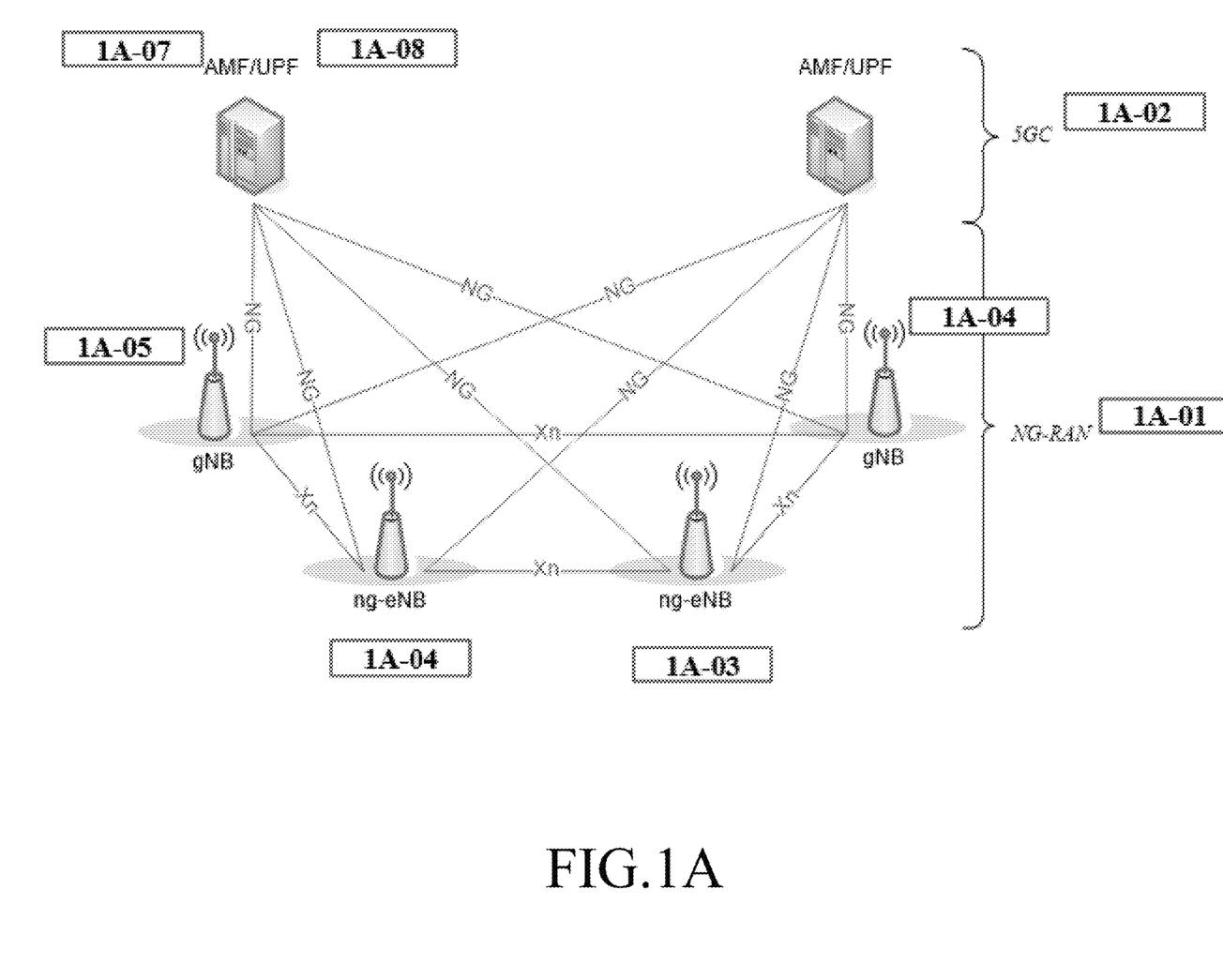
FIG. 1A is a diagram illustrating the architecture of an 5G system and a NG-RAN to which the disclosure may be applied.

FIG. 1A is a diagram illustrating the architecture of an 5G system and a NG-RAN to which the disclosure may be applied.

5G system consists of NG-RAN 1A-01 and 5GC 1A-02. An NG-RAN node is either:
- a gNB, providing NR user plane and control plane protocol terminations towards the UE; or
- an ng-eNB, providing E-UTRA user plane and control plane protocol terminations towards the UE.

The gNBs 1A-05 or 1A-06 and ng-eNBs 1A-03 or 1A-04 are interconnected with each other by means of the Xn interface. The gNBs and ng-eNBs are also connected by means of the NG interfaces to the 5GC, more specifically to the AMF (Access and Mobility Management Function) and to the UPF (User Plane Function). AMF 1A-07 and UPF 1A-08 may be realized as a physical node or as separate physical nodes.

A gNB 1A-05 or 1A-06 or an ng-eNBs 1A-03 or 1A-04 hosts the functions listed below.

Functions for Radio Resource Management such as Radio Bearer Control, Radio Admission Control, Connection Mobility Control, Dynamic allocation of resources to UEs in uplink, downlink and sidelink(scheduling); and IP and Ethernet header compression, uplink data decompression and encryption of user data stream; and Selection of an AMF at UE attachment when no routing to an MME can be determined from the information provided by the UE; and Routing of User Plane data towards UPF; and Scheduling and transmission of paging messages; and Scheduling and transmission of broadcast information (originated from the AMF or O&M); and Measurement and measurement reporting configuration for mobility and scheduling; and Session Management; and QoS Flow management and mapping to data radio bearers; and Support of UEs in RRC_INACTIVE state; and Radio access network sharing; and Tight interworking between NR and E-UTRA; and Support of Network Slicing.

The AMF 1A-07 hosts the functions such as NAS signaling, NAS signaling security, AS security control, SMF selection, Authentication, Mobility management and positioning management.

The UPF 1A-08 hosts the functions such as packet routing and forwarding, transport level packet marking in the uplink, QoS handling and the downlink, mobility anchoring for mobility etc.

Figure 1B:
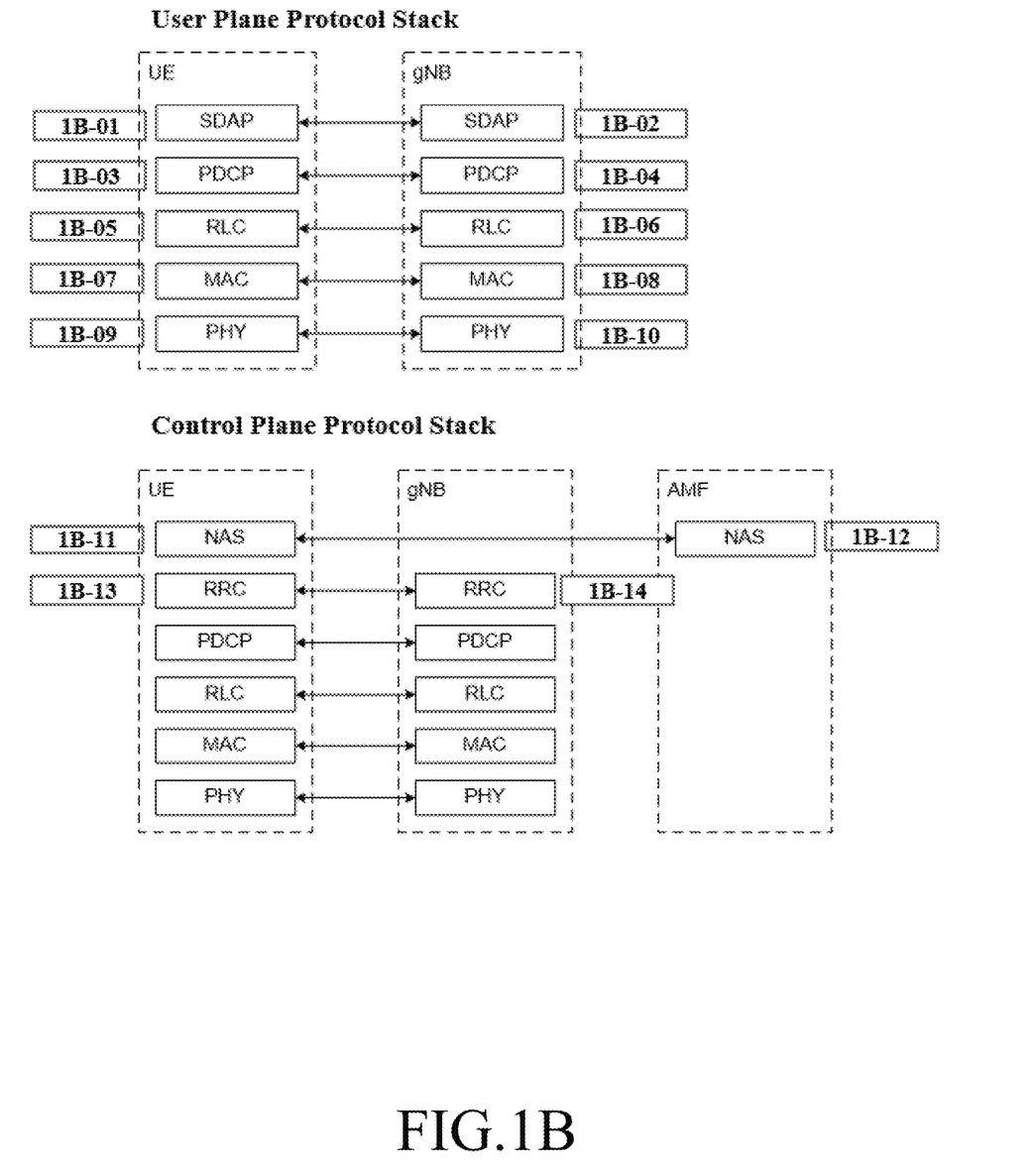
FIG. 1B is a diagram illustrating a wireless protocol architecture in an 5G system to which the disclosure may be applied.

FIG. 1B is a diagram illustrating a wireless protocol architecture in an 5G system to which the disclosure may be applied.

User plane protocol stack consists of SDAP 1B-01 or 1B-02, PDCP 1B-03 or 1B-04, RLC 1B-05 or 1B-06, MAC 1B-07 or 1B-08 and PHY 1B-09 or 1B-10. Control plane protocol stack consists of NAS 1B-11 or 1B-12, RRC 1B-13 or 1B-14, PDCP, RLC, MAC and PHY.

Each protocol sublayer performs functions related to the operations listed in the table 3.

TABLE 3

| Sublayer | Functions |
| --- | --- |
| NAS | authentication, mobility management, security control etc |
| RRC | System Information, Paging, Establishment, maintenance and release of an RRC connection, Security functions, Establishment, configuration, maintenance and release of Signalling Radio Bearers (SRBs) and Data Radio Bearers (DRBs), Mobility, QoS management, Detection of and recovery from radio link failure, NAS message transfer etc. |
| SDAP | Mapping between a QoS flow and a data radio bearer, Marking QoS flow ID (QFI) in both DL and UL packets. |
| PDCP | Transfer of data, Header compression and decompression, Ciphering and deciphering, Integrity protection and integrity verification, Duplication, Reordering and in-order delivery, Out-of-order delivery etc. |
| RLC | Transfer of upper layer PDUs, Error Correction through ARQ, Segmentation and re-segmentation of RLC SDUs, Reassembly of SDU, RLC re-establishment etc. |
| MAC | Mapping between logical channels and transport channels, Multiplexing/demultiplexing of MAC SDUs belonging to one or different logical channels into/from transport blocks (TB) delivered to/from the physical layer on transport channels, Scheduling information reporting, Priority handling between UEs, Priority handling between logical channels of one UE etc. |

TABLE 3-continued

| Sublayer | Functions |
| --- | --- |
| PHY | Channel coding, Physical-layer hybrid-ARQ processing, Rate matching, Scrambling, Modulation, Layer mapping, Downlink Control Information, Uplink Control Information etc. |

The terminal supports three RRC states. Table 4 lists the characteristics of each state.

TABLE 4

| RRC state | Characteristic |
| --- | --- |
| RRC_IDLE | PLMN selection; Broadcast of system information; Cell re-selection mobility; Paging for mobile terminated data is initiated by 5GC; DRX for CN paging configured by NAS. |
| RRC_INACTIVE | PLMN selection; Broadcast of system information; Cell re-selection mobility; Paging is initiated by NG-RAN (RAN paging); RAN-based notification area (RNA) is managed by NG-RAN; DRX for RAN paging configured by NG-RAN; 5GC - NG-RAN connection (both C/U-planes) is established for UE; The UE AS context is stored in NG-RAN and the UE; NG-RAN knows the RNA which the UE belongs to. |
| RRC_CONNECTED | 5GC - NG-RAN connection (both C/U-planes) is established for UE; The UE AS context is stored in NG-RAN and the UE; NG-RAN knows the cell which the UE belongs to; Transfer of unicast data to/from the UE; Network controlled mobility including measurements. |

Figure 1C:
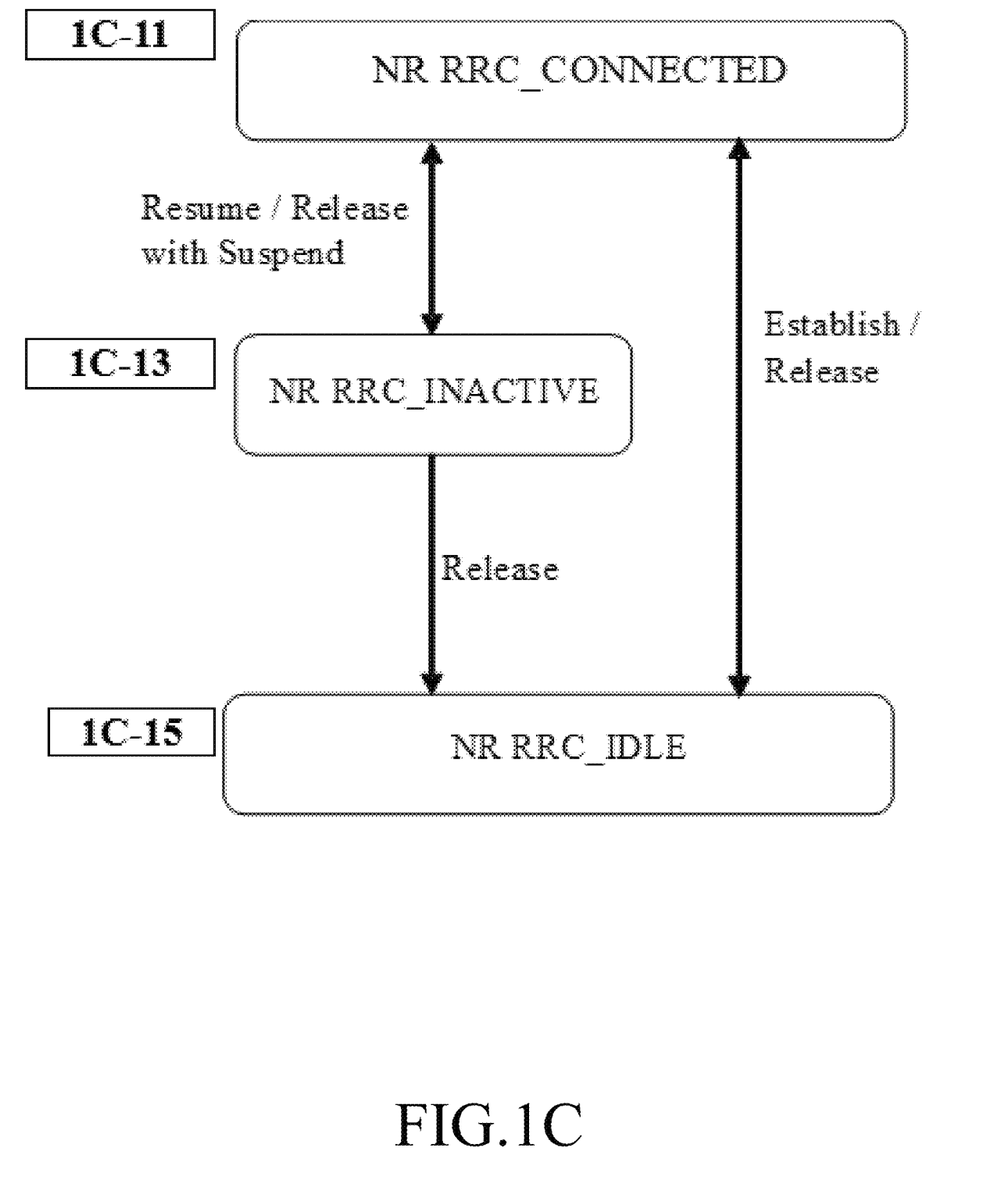
FIG. 1C is a diagram illustrating RRC state transition.

FIG. 1C is a diagram illustrating an RRC state transition.

Between RRC_CONNECTED 1C-11 and RRC_INACTIVE 1C-13, a state transition occurs due to the exchange of the Resume message and the Release message containing the Suspend IE.

A state transition occurs between RRC_CONNECTED 1C-11 and RRC_IDLE 1C-15 through RRC connection establishment and RRC connection release.

<SuspendConfig>
1. The first terminal identifier: an identifier of a terminal that may be included in the ResumeRequest when a state transition to RRC_CONNECTED is made. It has a 40-bit length.
2. The second terminal identifier: an identifier of a terminal that may be included in the Resume Request when a state transition to RRC_CONNECTED is made. It has a 24-bit length.
3. ran-Paging Cycle: Paging cycle to be applied in RRC_INACTIVE state.
4. ran-Notification AreaInfo: Configuration information of a ran-Notification Area consisting of a list of cells and the like. The terminal initiates a resume procedure when the ran_Notification Area is changed.
5. t380: Timer related to the periodic resumption procedure.
6. NextHopChangingCount (NCC): Counter used to derive new security keys after performing the resume procedure.
7. Extended-ran-Paging-Cycle: Paging cycle to be applied when extended DRX is configured. It indicates one of predefined values. rf256, rf512, rf1024 and reserved value.

UE's that are registered to more than one network need to be able to receive pages from more than one network. Dependent on UE capabilities (e.g., Rx and Tx capabilities) this can create situations in which a UE is occupied listening to pages from one network while pages from other networks also may be sent. Further UE's may be actively communicating with one network while another network pages the UE. If a user switch between communications towards different networks, situations may occur when a UE/user can no longer receive data from a network it was recently communicating in. Such situations can have a negative impact on performance, e.g., if pages are sent and not properly received, or if users are scheduled while not being able to receive communication.

In the disclosure, a method is provided for UE to request UE state transition for the purpose of UE power saving or to handle the aforementioned problems from MUSIM.

Figure 2A:
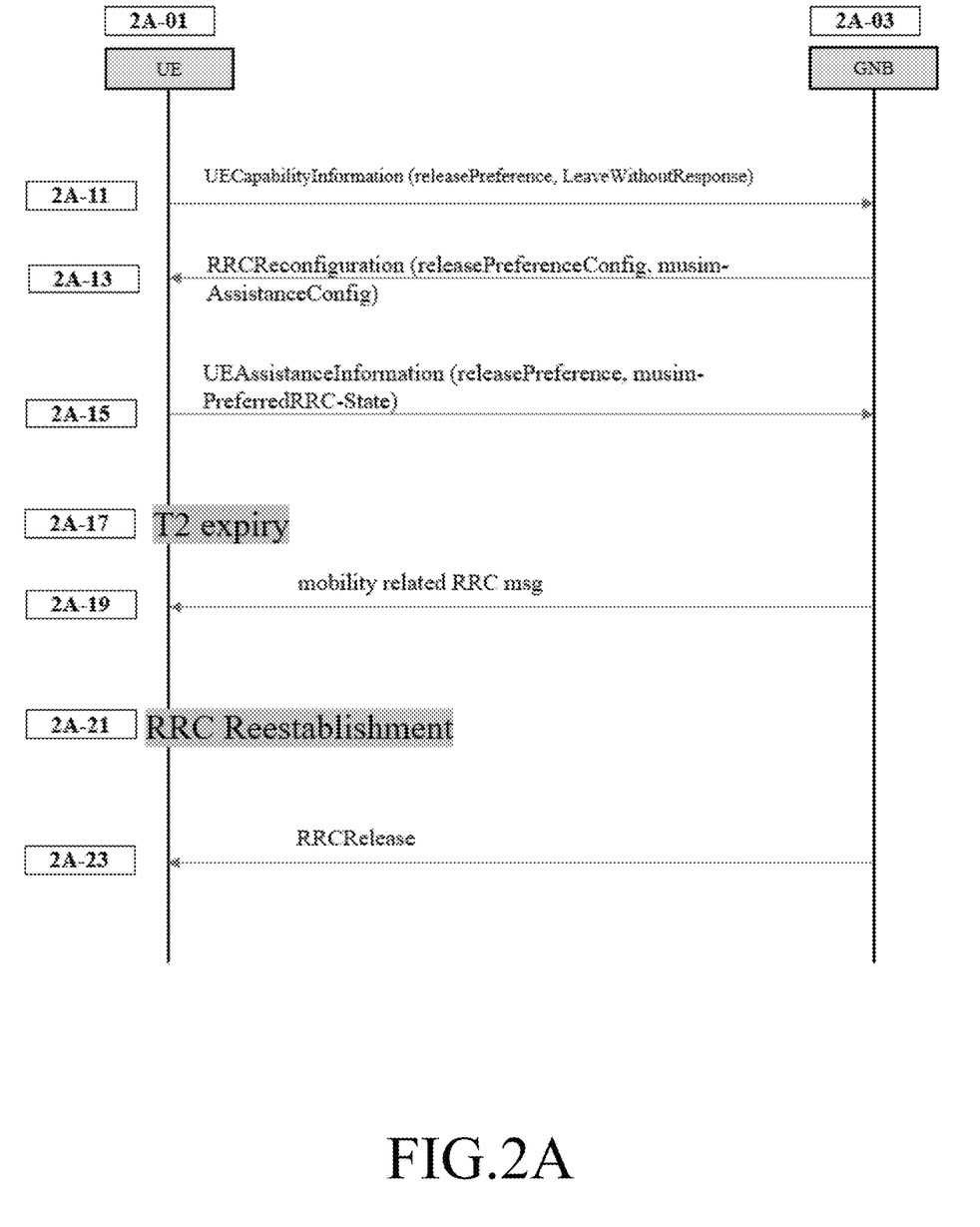
FIG. 2A is a diagram illustrating operations of a terminal and a base station according to an embodiment of the present invention.

FIG. 2A is a diagram illustrating operation of UE and base station

In 2A-11, UE(2A-01) transmits to GNB(2A-03) UECapabilityInformation. UECapability Information message is used to transfer UE radio access capabilities requested by the network.

UE may include in the message releasePreference capability IE and releaseRequestcapability IE. releasePreference IE indicates whether the UE supports providing its preference assistance information to transition out of RRC_CONNECTED for power saving. releaseRequest IE indicates whether the UE supports providing its assistance information to request transition out of RRC_CONNECTED for MUSIM.

UECapabilityInformation message includes a UE-NR-Capability IE. A UE-NR-Capability IE includes plurality of non-critical extensions. Non-critical extensions are characterised by the addition of new information to the original specification of the PDU type. If not comprehended, a non-critical extension may be skipped by the decoder, whilst the decoder is still able to complete the decoding of the comprehended parts of the PDU contents.

Non-critical extensions for UE-NR-Capability are defined release basis. A NCE for later release is placed later than a NCE for earlier release.

releasePreference capability IE and releaseRequest capability IE are placed under different non-critical extensions.

releaseRequest capability IE is enumerated with a single value of "supported". If UE includes releaseRequest capability IE in a NCE of UE-NR-Capability, UE supports the functionality of releaseRequest IE for both FDD and TDD and for both FR1 and FR2.

GNB determines the configuration to be applied to the UE based on the capability information received in 2A-11.

GNB generates RRCReconfiguration message based on the determined configuration.

In 2A-13, GNB transmits to UE RRCReconfiguration. The RRCReconfiguration message is the command to modify an RRC connection. It may convey information for measurement configuration, mobility control, radio resource configuration (including RBs, MAC main configuration and physical channel configuration) and AS security configuration.

GNB may include the UE assistance information configuration such as releasePreferenceConfig IE or musim-AssistanceConfig IE in the message. releasePreferenceConfig IE is configuration for the UE to report assistance information to inform the gNB about the UE's preference to leave RRC_CONNECTED state. releasePreferenceConfig IE includes rcleasePreferenceProhibitTimer which is a prohibit timer for release preference assistance information reporting. musim-AssistanceConfig IE is configuration for the UE to report assistance information for MUSIM. musim-AssistanceConfig IE includes musim-LeaveWithoutResponse Timer, which indicates the timer for UE to leave RRC_CONNECTED without network response.

UE consider itself to be configured to provide assistance information to transition out of RRC_CONNECTED if the received otherConfig of RRCReconfiguration message includes the releasePreferenceConfig and if releasePreferenceConfig is set to setup.

UE consider itself to be configured to provide MUSIM assistance information if the received otherConfig of RRCReconfiguration includes the musim-AssistanceConfig and if musim-AssistanceConfig is set to setup.

In 2A-15, UE initiates UE Assistance Information procedure to inform the network of its preference on the RRC state or its MUSIM assistance information.

A UE capable of providing assistance information to transition out of RRC_CONNECTED state may initiate the procedure if it was configured to do so, upon determining that it prefers to transition out of RRC_CONNECTED state, or upon change of its preferred RRC state.

A UE capable of providing MUSIM assistance information may initiate the procedure if it was configured to do so, upon determining that it needs to leave RRC_CONNECTED state, or upon determining it needs the gaps, or upon change of the gap information.

If UE is configured to provide its release preference and timer T1 is not running and if the UE determines that it would prefer to transition out of RRC_CONNECTED state, UE start timer T1 with the timer value set to the releasePreferenceProhibitTimer and UE initiates transmission of the UEAssistanceInformation message to provide the release preference.

If UE is configured to provide MUSIM assistance information and if the UE needs to leave RRC_CONNECTED state, UE initiate transmission of the UEAssistanceInformation message to provide MUSIM assistance information and UE start the timer T2 with the timer value set to the MUSIM-Leave WithoutResponseTimer.

If transmission of the UEAssistanceInformation message is initiated to provide a release preference, UE include releasePreference in the UEAssistanceInformation message. UE sets preferredRRC-State in releasePreference to the desired RRC state on transmission of the UEAssistanceInformation message.

If transmission of the UEAssistanceInformation message is initiated to provide MU SIM assistance information, UE includes musim-PreferredRRC-State in the UEAssistanceInformation. UE sets musim-PreferredRRC-State to the desired RRC state.

preferredRRC-State is enumerated with IDLE and INACTIVE and CONNECTED and OUTOFCONNECTED. musim-PreferredRRC-State is enumerated with IDLE and INACTIVE.

GNB receives the UEAssistanceInformation message. GNB recognize that UE prefer RRC state transition for power saving purpose if UEAssistanceInformation includes releasePreference IE. GNB recognize that UE requests RRC state transition for MUSIM purpose if UEAssistanceInformation includes musim-PreferredRRC-State IE.

If GNB successfully receives the UEAssistanceInformation message, GNB would take proper measure such as commanding UE state transition.

If GNB fails to receive the UEAssistanceInformation message, GNB does not take proper measure. In such case, T2 may expire. GNB can also send mobility related RRC message if GNB deemed required. 2A-17 or 2A-19 take place in such case.

In 2A-17, T2 expires. UE performs the first action set, which are listed below.

UE resets MAC. UE stops all timers that are running except T302 (related to RRCRelease with waitTime), T320 (related to validity time configured for dedicated priorities), T325 (related to RRCRelease message with deprioritisationTimer), T330 (related to LoggedMeasurementConfiguration), T331 (related to RRCRelease message with measIdleDuration) and T400 (related to RRCReconfigurationSidelink). UE stops T1 if running. UE releases all radio resources, including release of the RLC entity, the MAC configuration and the associated PDCP entity and SDAP for all established RBs. UE enter RRC_IDLE and perform cell selection.

In 2A-19, GNB may generates mobility related RRC message if UEAssistanceInformation is not received. Mobility related RRC message could be RRCReconfiguration message for handover or RRC reconfiguration message for conditional handover or MobilityFromNRCommand message.

RRCReconfiguration message for handover includes masterCellGroup IE which includes reconfiguration WithSync:

RRCReconfiguration message for conditional handover includes conditionalReconfiguration IE which includes another RRCReconfiguration message for handover.

MobilityFromNRCommand message is used to command handover from NR to E-UTRA/EPC, E-UTRA/5GC or UTRA-FDD. MobilityFromNRCommand message includes targetRAT-MessageContainer IE which carries information about the target cell identifier(s) and radio parameters relevant for the target radio access technology.

Upon receiving RRCReconfiguration message for handover, UE executes handover toward the cell indicated in RRCReconfiguration message and starts T304. UE initiates random access procedure in the target cell. If the random access procedure is successfully completed before T304 expires, UE consider the handover is successful.

After handover is successfully completed, UE checks whether the first condition set are met. If first condition set are met, UE performs the second action set. As consequence of second actions set UE transmits UEAssistanceInformation in the target cell and starts T2 to perform local release, if UE has transmitted UEAssistanceInformation in the source cell during the near fast.

First condition set includes following conditions.

If reconfiguration WithSync was included in masterCellGroup;

If the UE initiated transmission of a UEAssistanceInformation message during the last 1 second; and If the UE is still configured to provide the concerned UE assistance information The second action set includes followings.

UE stops T2 if running. UE initiates transmission of a UEAssistanceInformation message to provide the concerned UE assistance information. UE starts or restart T1 with the timer value set to the value of releasePreferenceProhibitTimer. UE starts T2 with the timer value set to the value of musim-Leave WithoutResponse Timer.

The reason UE stops T2 upon receiving RRCReconfiguration message for handover is to prevent local RRC connection release while handover is ongoing.

Upon receiving RRCReconfiguration message for conditional handover, UE evaluates execution condition based on the information in received RRCReconfiguration. If execution condition is fulfilled, UE executes handover toward the cell indicated in RRCReconfiguration message and starts T304. UE initiates random access procedure in the target cell. If the random access procedure is successfully completed before T304 expires, UE consider the handover is successful.

After conditional handover (or conditional reconfiguration) is successfully completed, UE checks whether the second condition set are met. If the second condition set are met, UE performs the second action set.

Second condition set includes following conditions.

If reconfiguration WithSync was included in masterCellGroup; and

If the RRCReconfiguration message is applied due to a conditional reconfiguration execution; and If the UE is configured to provide UE assistance information; and If the UE has initiated transmission of a UEAssistanceInformation message since it was configured to do so.

As consequence of second actions set UE transmits UEAssistanceInformation in the target cell and starts T2 to perform local release, if UE has transmitted UEAssistanceInformation in any cell.

The different handling as above is to mitigate the difference between the handover and the conditional handover. GNB knows the exact time when handover is executed. GNB does not know exact time when conditional handover is executed.

Upon receiving MobilityFromNRCommand message, UE checks whether T2 is running. If T2 is running, UE delays performing the action set until T2 expires. Upon expiry of T2, UE applies the first action set.

Alternatively, UE stops T2 and performs the first action set.

If T2 is not running, UE applies third action set. The third action set includes followings.

UE access the target cell indicated in the inter-RAT message in accordance with the specifications of the target RAT. UE resets MAC. UE stops all timers (including T1) that are running except T325, T330 and T400. UE releases all radio resources, including release of the RLC entity and the MAC configuration. UE releases the associated PDCP entity and SDAP entity for all established RBs.

If handover or mobility from NR fails, UE may initiate RRC connection re-establishment procedure.

In 2A-21, UE initiates RRC re-establishment procedure. UE performs fourth action set upon initiation of the procedure. The fourth action set includes followings.

UE stops T310 (related to physical layer problem detection) and T304 (related to handover) and T1. UE starts T311. UE resets MAC. UE suspend suspend all RBs except SR B0. UE performs cell selection.

Upon selecting a suitable NR cell, UE stops T311 and transmits RRCReestablishmentRequest message. If RRCReestablishment is received in response to RRCReestablishmentRequest, UE re-establishes the RRC connection based on the received RRC message.

If a suitable cell is not found until T311 expires, UE stops T2 and performs the first action set.

If GNB has received UEAssistanceInformation transmitted in 2A-15, GNB can transmits RRCRelease message for state transition instead of transmitting mobility related RRC message.

In 2A-23, GNB transmits RRCRelease message to UE. The RRCRelease message includes SuspendConfig.

Upon reception of RRCRelease, UE stops T2 and UE delays the fifth action set 60 ms from the moment the RRCRelease message was received or optionally when lower layers indicate that the receipt of the RRCRelease message has been successfully acknowledged, whichever is earlier.

Upon reception of RRCRelease, UE stops T2 before applying 60 ms delay and performs fifth action set after 60 ms delay.

UE stops timer T380 and T320 and T316 and T350. UE applies the received suspendConfig. UE resets MAC and releases the default MAC Cell Group configuration. UE re-establishes RLC entities for SRB1. UE stores in the UE Inactive AS Context the current KgNB and KRRCint keys, the ROHC state, the stored QoS flow to DRB mapping rules, the C-RNTI used in the source PCell, the cellIdentity and the physical cell identity of the source PCell.

By applying 60 ms delay, UE can transmit RLC acknowledgement for RRCRelease message. However, if 60 ms delay is applied to T2 stopage, T2 may expire to cause state transition to IDLE state before RLC acknowledgement is transmitted.

Figure 3A:
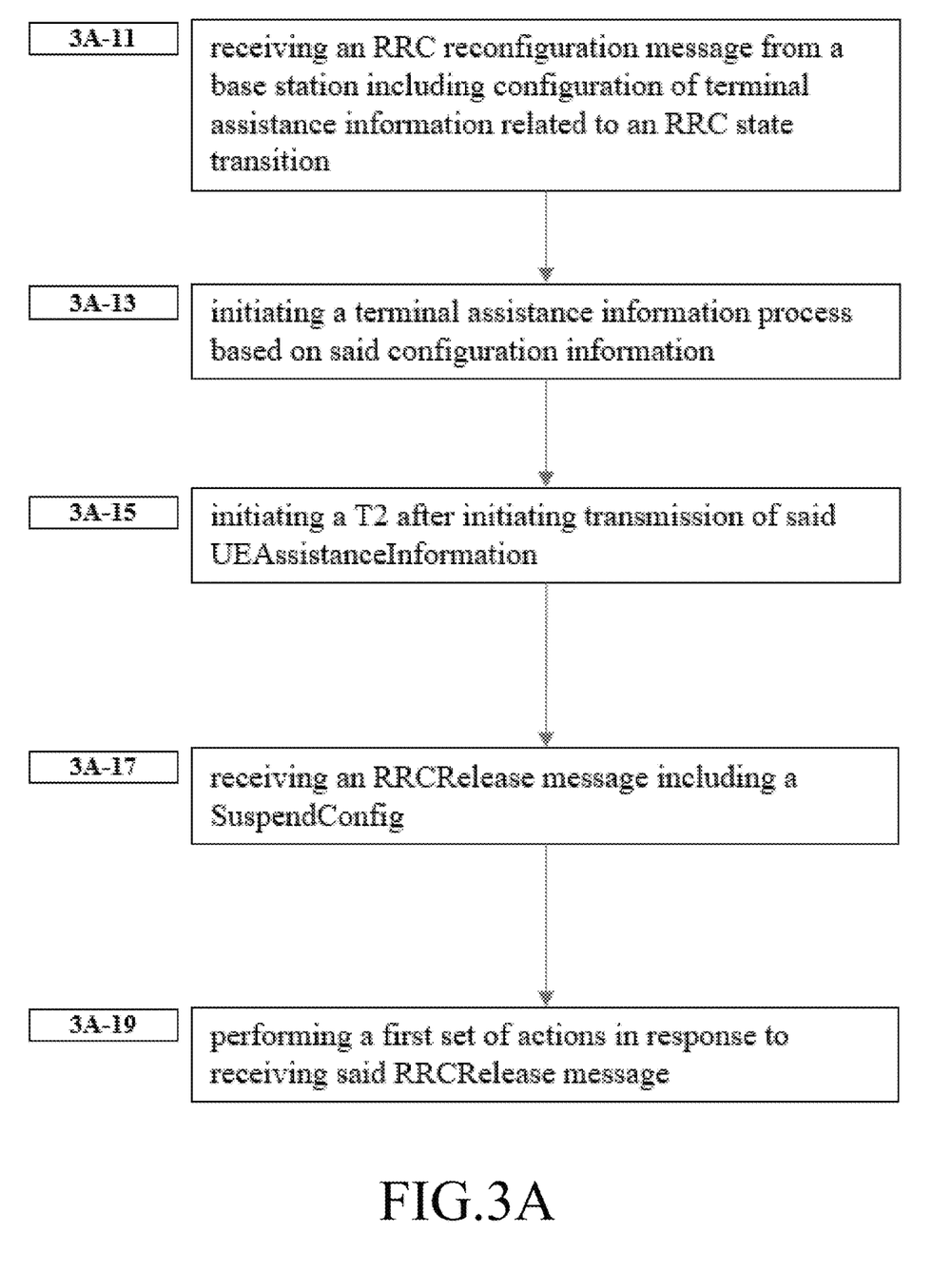
FIG. 3A is a flow diagram illustrating an operation of a terminal.

FIG. 3A illustrates the operation of the terminal.

In step 3A-11, the terminal receives an RRC reconfiguration message from the base station that includes configuration information for terminal assistance information associated with the RRC state transition.

In step 3A-13, the terminal initiates a terminal assistance information process based on the above configuration information in the RRC reconfiguration message.

In step 3A-15, the terminal initiates transmission of the UEAssistanceInformation if the UEAssistanceInformation includes the musim-PreferredRRC-State IE, and then initiates T2.

In step 3A-17, the terminal receives an RRCRelease message containing SuspendConfig.

In step 3A-19, the terminal performs a first set of actions in response to receiving said RRCRelease message.

The first set of actions includes stopping T2, applying SuspendConfig, and entering the INACTIVE state.

The first action of the first set of actions is executed before applying the 60 ms delay, the remaining actions of the first set of actions are executed after applying the 60 ms delay, and the first action of the first set of actions is a T2 stop.

The terminal assistance information configuration related to the above RRC state transition includes a timer value for T2.

If musim-PreferredRRC-State is set to the value of the field indicating the RRC_INACTIVE state, it shall transition to the RRC_INACTIVE state upon successful receipt of the RRCRelease message and to the RRC_IDLE state upon expiration of T2.

If an RRC reconfiguration failure is detected before receiving the RRCRelease message, the RRC connection re-establishment procedure is initiated and T311 is started, and Tis stopped when T311 expires.

If an RRC reconfiguration failure is detected before receiving an RRCRelease message, it initiates the RRC connection re-establishment procedure and starts T311, and if T2 is running and T311 expires, it considers T2 to have expired and transitions to the RRC_IDLE state. When T311 expires, the device transitions to the RRC_IDLE state and initiates the NAS recovery procedure. On the other hand, if T2 expires, the terminal transitions to the RRC_IDLE state and does not initiate the NAS recovery process. The NAS recovery process involves establishing a new RRC connection, which can adversely affect MSIM behavior. For this reason, when T311 expires, it behaves as if T2 has expired.

If the terminal transmits a UECapabilityInformation containing multiple NCEs to the base station, and the IEs related to T2 are included in the NCEs of the UECapabilityInformation, it means that the functions related to T2 are supported by the terminal in FDD and TDD and FR1 and FR2.

Figure 4A:
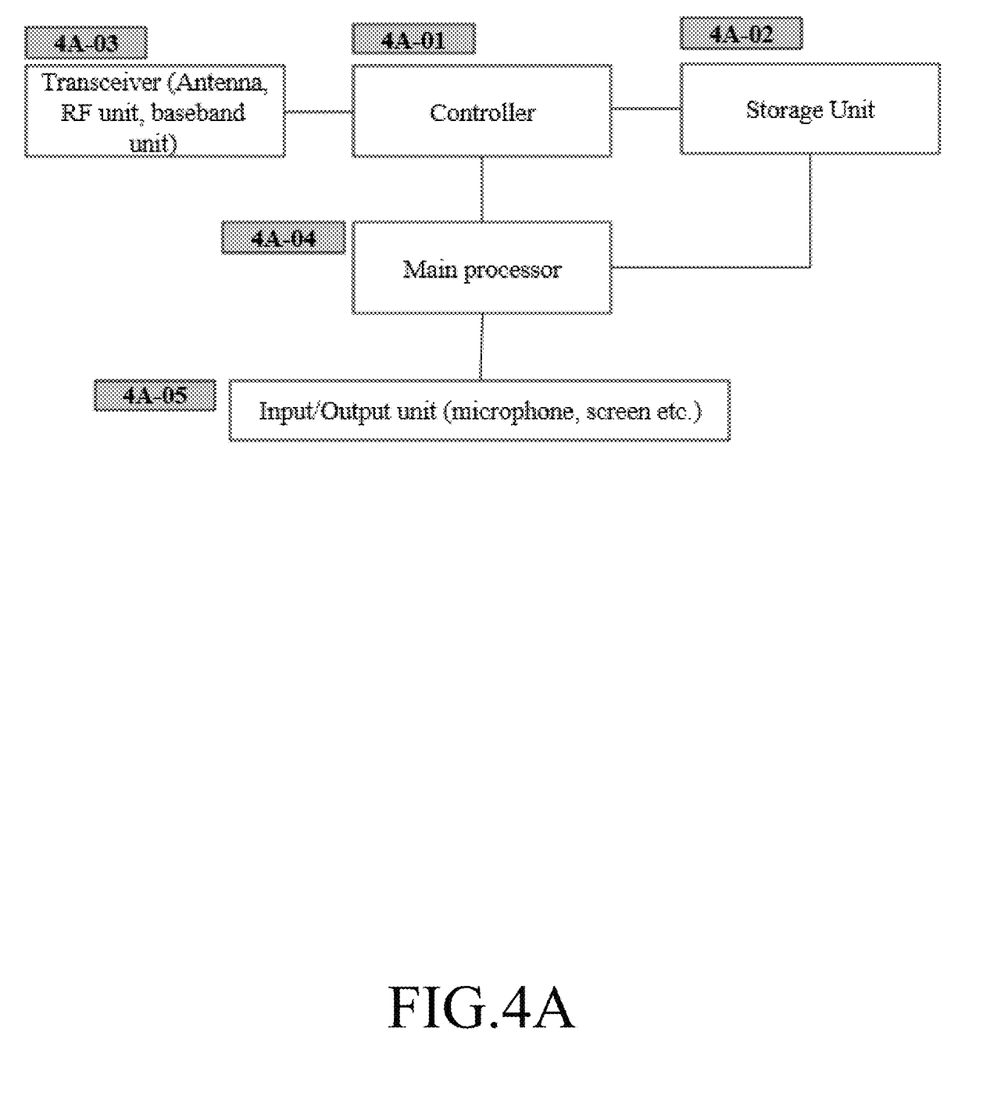
FIG. 4A is a block diagram illustrating the internal structure of a UE to which the disclosure is applied.

FIG. 4A is a block diagram illustrating the internal structure of a UE to which the disclosure is applied.

Referring to the diagram, the UE includes a controller 4A-01, a storage unit 4A-02, a transceiver 4A-03, a main processor 4A-04 and I/O unit 4A-05.

The controller 4A-01 controls the overall operations of the UE in terms of mobile communication. For example, the controller 4A-01 receives/transmits signals through the transceiver 4A-03. In addition, the controller 4A-01 records and reads data in the storage unit 4A-02. To this end, the controller 4A-01 includes at least one processor. For example, the controller 4A-01 may include a communication processor (CP) that performs control for communication and an application processor (AP) that controls the upper layer, such as an application program. The controller controls storage unit and transceiver such that UE operations illustrated in FIG. 2A and FIG. 3A are performed.

The storage unit 4A-02 stores data for operation of the UE, such as a basic program, an application program, and configuration information. The storage unit 4A-02 provides stored data at a request of the controller 4A-01.

The transceiver 4A-03 consists of a RF processor, a baseband processor and one or more antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mi10r, an oscillator, a digital-to-analog converter (DAC), an analog-to-digital converter (ADC), and the like. The RF processor may perform MIMO and may receive multiple layers when performing the MIMO operation. The baseband processor performs a function of conversion between a baseband signal and a bit string according to the physical layer specification of the system. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The main processor 4A-04 controls the overall operations other than mobile operation. The main processor 4A-04 process user input received from I/O unit 4A-05, stores data in the storage unit 4A-02, controls the controller 4A-01 for required mobile communication operations and forward user data to I/O unit 4A-05.

I/O unit 4A-05 consists of equipment for inputting user data and for outputting user data such as a microphone and a screen. I/O unit 4A-05 performs inputting and outputting user data based on the main processor's instruction.

Figure 4B:
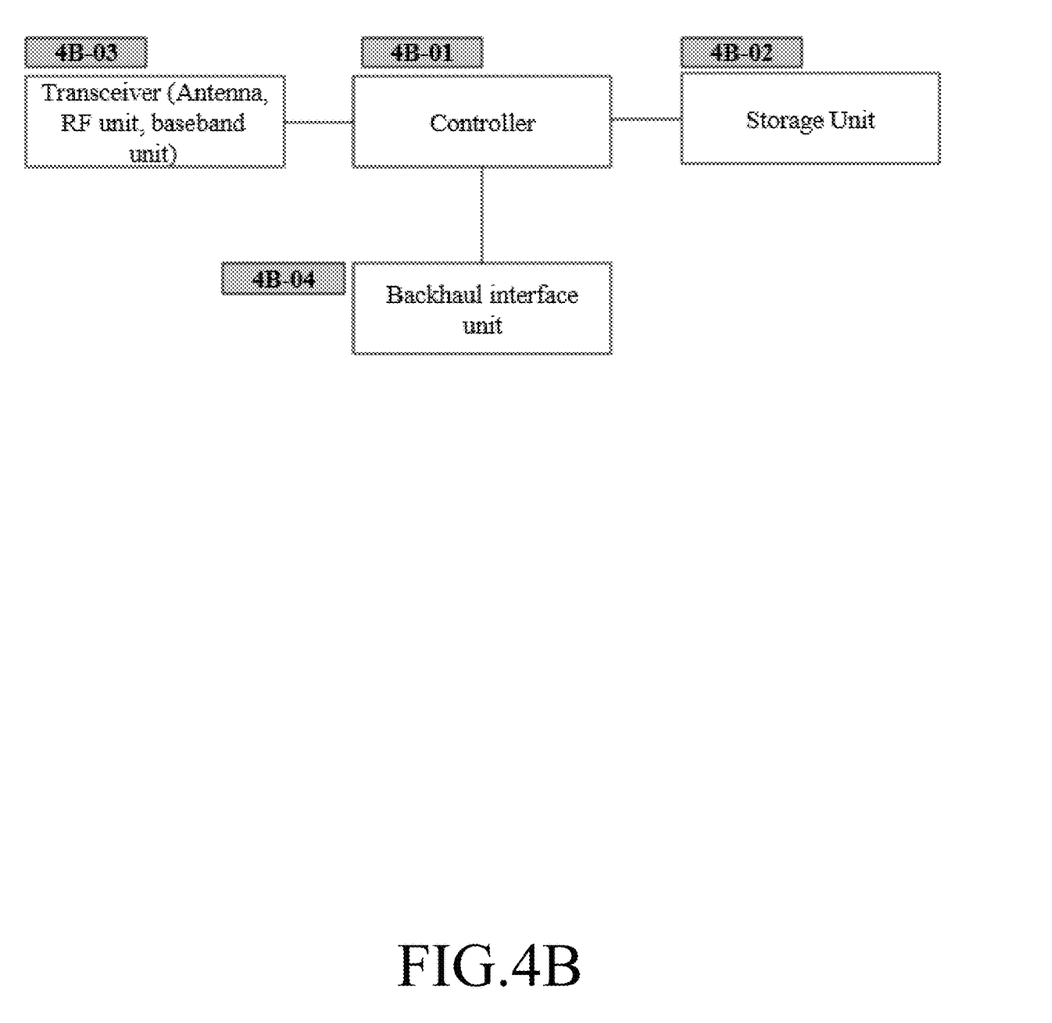
FIG. 4B is a block diagram illustrating the configuration of a base station according to the disclosure.

FIG. 4B is a block diagram illustrating the configuration of a base station according to the disclosure.

As illustrated in the diagram, the base station includes a controller 4B-01, a storage unit 4B-02, a transceiver 4B-03 and a backhaul interface unit 4B-04.

The controller 4B-01 controls the overall operations of the main base station. For example, the controller 4B-01 receives/transmits signals through the transceiver 4B-03, or through the backhaul interface unit 4B-04. In addition, the controller 4B-01 records and reads data in the storage unit 4B-02. To this end, the controller 4B-01 may include at least one processor. The controller controls transceiver, storage unit and backhaul interface such that base station operation illustrated in FIG. 2A are performed.

The storage unit 4B-02 stores data for operation of the main base station, such as abasic program, an application program, and configuration information. Particularly, the storage unit 4B-02 may store information regarding a bearer allocated to an accessed UE, a measurement result reported from the accessed UE, and the like. In addition, the storage unit 4B-02 may store information serving as a criterion to determine whether to provide the UE with multi-connection or to discontinue the same. In addition, the storage unit 4B-02 provides stored data at a request of the controller 4B-01.

The transceiver 4B-03 consists of a RF processor, a baseband processor and one or more antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mi10r, an oscillator, a DAC, an ADC, and the like. The RF processor may perform a down link MIMO operation by transmitting at least one layer. The baseband processor performs a function of conversion between a baseband signal and a bit string according to the physical layer specification of the first radio access technology. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The backhaul interface unit 4B-04 provides an interface for communicating with other nodes inside the network. The backhaul interface unit 4B-04 converts a bit string transmitted from the base station to another node, for example, another base station or a core network, into a physical signal, and converts a physical signal received from the other node into a bit string.

What is claimed is:

1. A method by a terminal, the method comprising:

transmitting, by the terminal to a base station, a UECapabilityInformation, wherein the UECapabilityInformation comprises first capability information related to provision of Multi-Universal Subscriber Identity Module (MUSIM) assistance data, and wherein the first capability information being comprised in the non-critical extension of UE-NR-Capability indicates that provision of MUSIM assistance data is supported in Frequency Division Multiplexing (FDD) and in Time Division Multiplexing (TDD) and in Frequency Region (FR) 1 and in FR2;

receiving, by the terminal from the base station, a RRCReconfiguration, wherein the RRCReconfiguration comprises configuration information related to terminal state transition, wherein the configuration information related to terminal state transition comprises information for a first timer, and wherein the first timer is related to terminal state transition;

transmitting, by the terminal to the base station, a UEAssistanceInformation, wherein the UEAssistanceInformation comprises information related to a state requested by the terminal, and wherein the state requested by the terminal is a first state;

starting, by the terminal, the first timer after initiating transmission of the UEAssistanceInformation; and performing, by the terminal, state transition to a second state when the first timer expires, wherein the terminal restarts the first timer when a first handover is completed, wherein the first handover is performed from a first new radio (NR) cell to a second NR cell, wherein the terminal does not restart the first timer when a second handover is completed, and wherein the second handover is performed from the first NR cell to an Evolved Universal Terrestrial Radio Access (EUTRA) cell.

2. A terminal in a wireless communication system, the terminal comprising:

a transceiver configured to transmit and receive a signal; and a controller configured to:

transmit to a base station a UECapabilityInformation, wherein the UECapabilityInformation comprises first capability information related to provision of Multi-Universal Subscriber Identity Module (MUSIM) assistance data, and wherein the first capability information being comprised in the non-critical extension of UE-NR-Capability indicates that provision of MUSIM assistance data is supported in Frequency Division Multiplexing (FDD) and in Time Division Multiplexing (TDD) and in Frequency Region (FR) 1 and in FR2;

receive, from the base station, a RRCReconfiguration, wherein the RRCReconfiguration comprises configuration information related to terminal state transition, wherein the configuration information related to terminal state transition comprises information for a first timer, and wherein the first timer is related to terminal state transition, transmit, to the base station, a UEAssistanceInformation, wherein the UEAssistanceInformation comprises information related to a state requested by the terminal, wherein the state requested is a first state, start the first timer after initiating transmission of the UEAssistanceInformation, and perform state transition to a second state when the first timer expires, wherein the terminal restarts the first timer when a first handover is completed, wherein the first handover is performed from a first new radio (NR) cell to a second NR cell, wherein the terminal does not restart the first timer when a second handover is completed, and wherein the second handover is performed from the first NR cell to an Evolved Universal Terrestrial Radio Access (EUTRA) cell.

* * * * *